US012572099B2

(12) United States Patent
Jeong et al.

(10) Patent No.: US 12,572,099 B2
(45) Date of Patent: Mar. 10, 2026

(54) CONTROL OF DRIVE UNIT ACCORDING TO DETECTION OF AMOUNT OF TONER IN TONER REFILL CARTRIDGE

(71) Applicant: Hewlett-Packard Development Company, L.P., Spring, TX (US)

(72) Inventors: Seongho Jeong, Seongnam (KR); Jongwon Han, Seongnam (KR); Sungchul Ahn, Seongnam (KR); Junhui Kim, Seongnam (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 44 days.

(21) Appl. No.: 18/292,332

(22) PCT Filed: Jan. 12, 2022

(86) PCT No.: PCT/US2022/012124
§ 371 (c)(1),
(2) Date: Jan. 25, 2024

(87) PCT Pub. No.: WO2023/027761
PCT Pub. Date: Mar. 2, 2023

(65) Prior Publication Data
US 2024/0345518 A1 Oct. 17, 2024

(30) Foreign Application Priority Data
Aug. 26, 2021 (KR) ........................ 10-2021-0113184

(51) Int. Cl.
*G03G 15/08* (2006.01)
*G03G 15/00* (2006.01)

(52) U.S. Cl.
CPC ......... *G03G 15/50* (2013.01); *G03G 15/0856* (2013.01); *G03G 15/0865* (2013.01);
(Continued)

(58) Field of Classification Search
CPC ............... G03G 15/50; G03G 15/0865; G03G 15/0877; G03G 15/0887; G03G 15/556;
(Continued)

(56) References Cited

U.S. PATENT DOCUMENTS 4,004,714 A * 1/1977 Ito ...................... G03G 15/0856 222/404
5,652,947 A * 7/1997 Izumizaki .......... G03G 15/0879 399/258
(Continued)

FOREIGN PATENT DOCUMENTS

JP 03236077 A * 10/1991
JP 07-114256 A 5/1995
(Continued)

*Primary Examiner* — Stephanie E Bloss
*Assistant Examiner* — Laura Roth
(74) *Attorney, Agent, or Firm* — Foley & Lardner LLP

(57) ABSTRACT

An image forming apparatus includes: a body comprising a developing device, and a mounting unit from which a toner refill cartridge is detachable and which is connected to the developing device and delivers toner accommodated in the toner refill cartridge to the developing device. The body includes a housing having a communication hole so that the toner refill cartridge is mounted on the mounting unit from outside the image forming apparatus. The image forming apparatus includes a drive unit to provide a driving force to the toner refill cartridge so that toner is supplied from the toner refill cartridge to the developing device: a detecting unit to acquire a detected value corresponding to an amount of toner in the toner refill cartridge; and a controller to control an operation of the drive unit based on the detected value.

14 Claims, 9 Drawing Sheets

(52) U.S. Cl.
CPC ....... *G03G 15/087* (2013.01); *G03G 15/0877* (2013.01); *G03G 15/0886* (2013.01); *G03G 15/0887* (2013.01); *G03G 15/553* (2013.01); *G03G 15/556* (2013.01); *G03G 2215/0668* (2013.01); *G03G 2215/0673* (2013.01); *G03G 2215/0678* (2013.01)

(58) Field of Classification Search
CPC ....... G03G 2215/0673; G03G 15/0856; G03G 15/0867; G03G 15/0894; G03G 15/553; G03G 15/0886; G03G 15/087; G03G 21/1647; G03G 2215/0668; G03G 2221/1657; G03G 15/0874; G03G 2215/0692; G03G 2215/0678; G03G 2215/0675; G03G 2221/1648; G03G 15/0898; G03G 15/0858; G03G 15/086; G03G 15/08862

See application file for complete search history.

(56) References Cited

U.S. PATENT DOCUMENTS

| | | | | |
|---|---|---|---|---|
| 6,181,886 | B1 * | 1/2001 | Hockey | G03G 21/12 399/35 |
| 7,171,132 | B2 | 1/2007 | Yabuki et al. | |
| 11,815,831 | B2 * | 11/2023 | Kubo | G03G 15/0877 |
| 2010/0209141 | A1 | 8/2010 | Ikado | |
| 2010/0247118 | A1 | 9/2010 | Sakamoto et al. | |
| 2012/0033982 | A1 | 2/2012 | Kubota et al. | |
| 2013/0330105 | A1 | 12/2013 | Komatsu et al. | |
| 2020/0333725 | A1 * | 10/2020 | Tomura | G01F 23/266 |
| 2021/0026272 | A1 | 1/2021 | Fitzgerald et al. | |
| 2021/0053352 | A1 | 2/2021 | Smith et al. | |
| 2021/0080863 | A1 | 3/2021 | Hong et al. | |
| 2025/0237975 | A1 * | 7/2025 | Choi | G03G 15/0867 |

FOREIGN PATENT DOCUMENTS

| | | | | |
|---|---|---|---|---|
| WO | 2019/199327 | A1 | 10/2019 | |
| WO | 2020/242453 | A1 | 12/2020 | |
| WO | WO-2023018441 | A1 * | 2/2023 | F16H 1/16 |

* cited by examiner

CONTROL OF DRIVE UNIT ACCORDING TO DETECTION OF AMOUNT OF TONER IN TONER REFILL CARTRIDGE

CROSS-REFERENCE TO RELATED APPLICATIONS

This application is a U.S. National Stage Patent Application under 35 U.S.C. § 371 of PCT/US2022/012124, filed Jan. 12, 2022, which claims priority to Korean Patent Application No. 10-2021-0113184, filed Aug. 26, 2021, which are hereby incorporated by reference in their entireties.

BACKGROUND

Image forming apparatuses use a toner to print an image on paper. Because the toner is used whenever an image forming operation is performed, the toner is exhausted after use over time. When the toner is exhausted, a component for storing the toner may be replaced, or the component may be refilled with a toner.

BRIEF DESCRIPTION OF THE DRAWINGS

The present disclosure may be easily understood by the combination of the following detailed description and accompanying drawings, and reference numerals refer to structural elements.

DETAILED DESCRIPTION

Figure 1:
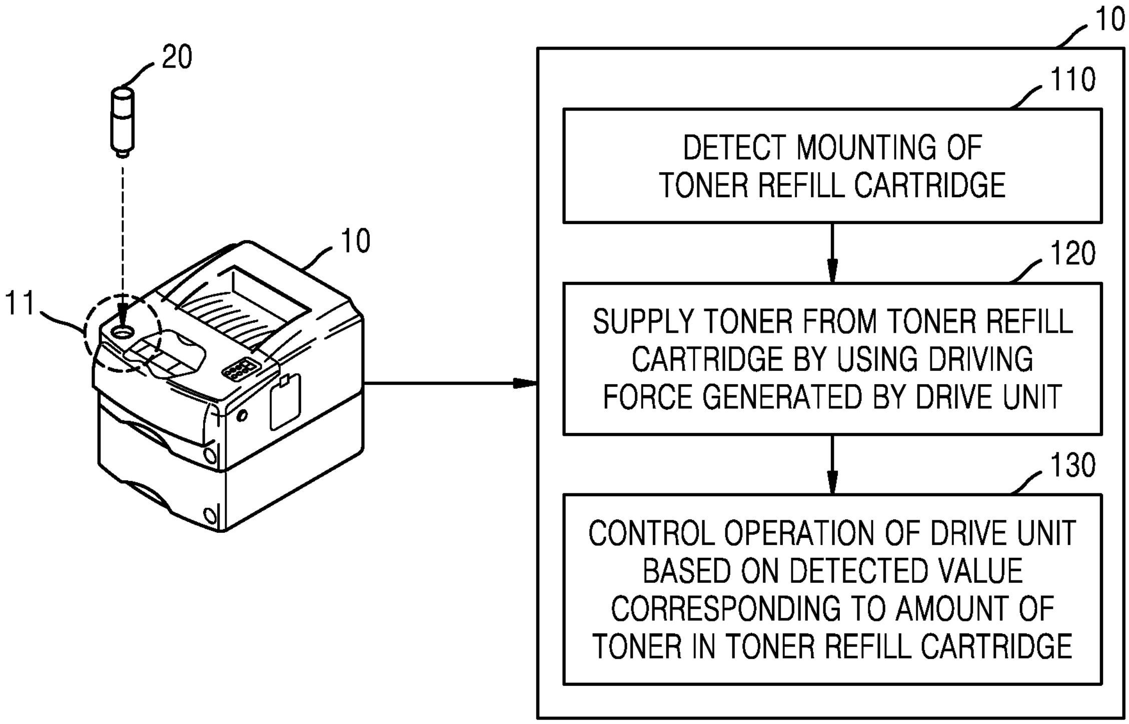
FIG. 1 is a conceptual view of an example for describing an operating method of an image forming apparatus, whereby toner is supplied to the image forming apparatus in a toner refill cartridge and a subsequent operation is performed according to a result of detecting a toner supply state.

Hereinafter, some implementations of the present disclosure will be described in detail with reference to the accompanying drawings so that those skilled in the art to which the present disclosure pertains can easily implement them. However, the present disclosure may be implemented in several different forms and is not limited to the implementations described herein.

A toner refill cartridge can be mounted from the outside of an image forming apparatus. When the supply of toner from the toner refill cartridge is completed, the image forming apparatus performs an operation. In cases where a user manually manipulates a toner refill cartridge to perform a toner supply operation, user convenience may be reduced. In other examples, even when the supply of toner is automatically performed from the toner refill cartridge, the completion of the supply of toner may not be detected. In some examples of the present disclosure, an image forming apparatus automatically detects a toner supply state as toner is supplied to the image forming apparatus from the toner refill cartridge, and the image forming apparatus controls an operation of a drive unit according to the toner supply state.

An image forming apparatus according to some examples of the present disclosure may include a developing device, a mounting unit from which a toner refill cartridge is detachable and which is connected to the developing device and delivers toner accommodated in the toner refill cartridge to the developing device, a body including a housing provided with a communication hole so that the toner refill cartridge may be mounted on the mounting unit from the outside, a drive unit that provides a driving force to the toner refill cartridge so that the toner may be supplied to the developing device from the toner refill cartridge, a detecting unit that acquires a detected value corresponding to the amount of toner in the toner refill cartridge, and a controller that controls an operation of the drive unit based on the detected value.

An “image forming apparatus” may refer to any of various apparatuses capable of performing an image forming operation, such as a printer, a scanner, a fax machine, a multi-function printer (MFP), a display device, etc. Also, the image forming apparatus may be a two-dimensional (2D) image forming apparatus or a three-dimensional (3D) image forming apparatus. An “image forming operation to be performed by an image forming apparatus” may be an operation related to printing, copying, scanning, faxing, storage, transmission, coating, etc., or a combination of two or more of the above operations.

A body of the “image forming apparatus” may include a developing device, a mounting unit from which a toner refill cartridge is detachable, and a housing provided with a communication hole. The image forming apparatus may include a drive unit that provides a driving force to the toner refill cartridge so that a toner may be supplied to the developing device from the toner refill cartridge. The image forming apparatus may include a detecting unit that detects the amount of toner within the toner refill cartridge, and a controller that controls an operation of the drive unit based on the amount of toner in the toner refill cartridge and a driving time of the drive unit.

A “toner refill cartridge” may be a cartridge for supplying a toner to a developing device of the image forming apparatus. The toner refill cartridge may be mounted on the mounting unit of the image forming apparatus through the housing provided with a communication hole in the body of the image forming apparatus. The toner refill cartridge may include a discharge hole through which the toner is discharged, and a shutter for opening or closing the discharge hole. For example, the shutter of the toner refill cartridge may open the discharge hole by receiving a driving force from the drive unit of the image forming apparatus. For example, the toner in the toner refill cartridge may be charge the developing device via the discharge hole and an inlet of the mounting unit. When the supply of toner from the toner refill cartridge is completed, the shutter may be closed, and the toner refill cartridge may be removed from the mounting unit.

A "detecting unit" may detect a detected value corresponding to the amount of toner within the toner refill cartridge. For example, the detecting unit may include at least one of a capacitive sensor that detects a capacitance between two electrodes, a piezoelectric sensor that detects a frequency according to the amount of toner within the toner refill cartridge, a photosensor that detects a transmittance of light, and a load detecting unit that detects a load of the toner refill cartridge. The detecting unit may acquire a detected value corresponding to the amount of toner within the toner refill cartridge. For example, the detecting unit may acquire a detected value at a start time point at which the toner is supplied to the developing device from the toner refill cartridge, and a detected value at a certain time point after the start time point. For example, the detected value at the certain time point may be used to determine the toner supply state. For example, a difference value between the detected value at the certain time point and the detected value at the start time point may be used to determine the toner supply state.

In some examples, the detecting unit may calculate the amount of toner within the toner refill cartridge based on the detected value. The detecting unit may deliver the detected value to the controller, and the controller may calculate the amount of toner within the toner refill cartridge based on detection information.

A "toner supply state" may represent a supply progress state of a toner supplied from the toner refill cartridge to the developing device. For example, the toner supply state may be classified into a toner supply completion state, a toner supply error state, and a toner supply incomplete state. The toner supply completion state may mean a state in which the supply of the toner in the toner refill cartridge to the developing device is normally completed. The toner supply error state may mean a state in which the supply of the toner in the toner refill cartridge to the developing device is abnormally performed. The toner supply incomplete state may mean a state in which the toner in the toner refill cartridge is being supplied to the developing device.

The toner supply state may be determined based on the amount of toner in the toner refill cartridge or the detected value corresponding to the amount of toner. Also, the toner supply state may be determined based on the detected value corresponding to the amount of toner in the toner refill cartridge and a driving time of the drive unit. For example, the amount of toner in the toner refill cartridge may be calculated based on the detected value acquired by the detecting unit. The amount of toner in the toner refill cartridge may be calculated by the detecting unit or the controller.

According to an image forming apparatus described in FIGS. 1 through 10, as the toner is supplied from the toner refill cartridge to the developing device, the image forming apparatus may check the toner supply state based on the detected value acquired from the detecting unit and may automatically control an operation of the drive unit corresponding to the toner supply state. Thus, a toner supply operation from the toner refill cartridge to the developing device may be quickly and accurately performed.

FIG. 1 is a conceptual view of an example for describing an operation of an image forming apparatus, in which a toner is supplied from the toner refill cartridge to the image forming apparatus and a subsequent operation is performed according to a result of detecting a toner supply state.

Referring to FIG. 1, a body of an image forming apparatus 10 may include a housing provided with a communication hole 11 through which a toner refill cartridge 20 may be mounted from the outside of the body of the image forming apparatus 10. The toner refill cartridge 20 may be mounted on the mounting unit for accommodating the toner refill cartridge 20 through the housing. In Operation 110 of the image forming apparatus 10, the image forming apparatus 10 may detect the mounting of the toner refill cartridge 20.

In Operation 120 of the image forming apparatus 10, the image forming apparatus 10 may supply the toner to the image forming apparatus 10 from the toner refill cartridge 20 by using a driving force generated in the drive unit within the image forming apparatus 10. Even when the toner in the toner refill cartridge 20 is not manually supplied to the image forming apparatus 10, the image forming apparatus 10 may provide the driving force to the toner refill cartridge 20, thereby supplying the toner in the toner refill cartridge 20 to the developing device of the image forming apparatus 10. As the toner is supplied from the toner refill cartridge 20 to the image forming apparatus 10, the detecting unit in the image forming apparatus 10 may acquire a detected value corresponding to the amount of toner in the toner refill cartridge 20. For example, when the detecting unit is a capacitive sensor, the capacitive sensor may be mounted in the vicinity of the discharge hole of the toner refill cartridge 20. The image forming apparats 10 may detect the amount of toner in the toner refill cartridge 20 based on a value of the capacitance acquired from the capacitive sensor. For example, the image forming apparatus 10 may detect the amount of toner in the toner refill cartridge 20 based on a difference value between capacitance values at different time points.

In Operation 130 of the image forming apparatus 10, the image forming apparatus 10 may control the operation of the drive unit based on the detected value corresponding to the amount of toner in the toner refill cartridge 20. For example, the image forming apparatus 10 may control the operation of the drive unit based on the detected value corresponding to the amount of toner in the toner refill cartridge 20 and the driving time of the drive unit.

In some examples, the image forming apparatus 10 may determine whether the supply of toner to the image forming apparatus 10 from the toner refill cartridge 20 is normally completed based on the amount of toner in the toner refill cartridge 20 and the driving time of the drive unit. For example, when the toner supply state is the toner supply completion state or the toner supply error state, the image forming apparatus 10 may control the drive unit to stop operation. For example, when the toner supply state is the toner supply completion state, the image forming apparatus 10 may update a toner gauge. For example, when the toner supply state is the toner supply incomplete state, the image forming apparatus 10 may control a driving operation of the drive unit so that the toner may be supplied from the toner refill cartridge 20 to the image forming apparatus 10.

Figure 2:
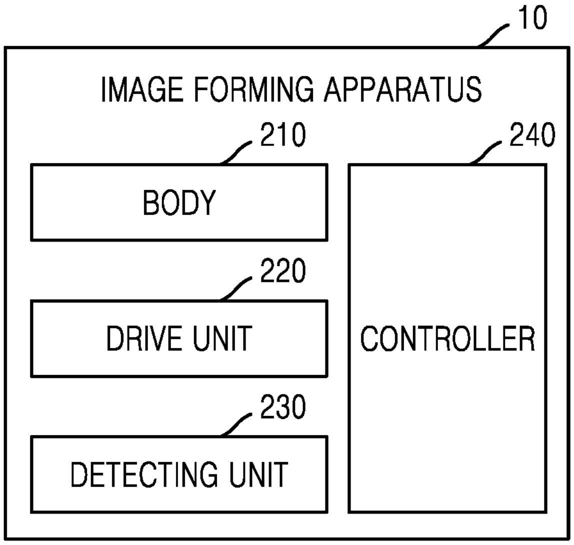
FIG. 2 is a block diagram of an example configuration of an image forming apparatus.

FIG. 2 is a block diagram of an example configuration of the image forming apparatus 10.

Referring to FIG. 2, the image forming apparatus 10 may include a body 210, a drive unit 220, a detecting unit 230, and a controller 240. However, in other examples, the image forming apparatus 10 may be implemented by more components than the illustrated components, or the image forming apparatus 10 may be implemented by fewer components.

In some examples, the body 210 may include a developing device, a mounting unit from which the toner refill cartridge 20 is detachable and which is connected to the developing device and delivers the toner accommodated in the toner refill cartridge 20 to the developing device, and a housing provided with a communication hole so that the toner refill cartridge 20 may be mounted on the mounting unit from the outside of the body 210.

In some examples, the drive unit 220 may provide a driving force to the toner refill cartridge 20 so that the toner may be supplied from the toner refill cartridge 20 to the developing device. The toner refill cartridge 20 may open the discharge hole of the toner refill cartridge 20 by receiving the driving force from the drive unit 220. The toner in the toner refill cartridge 20 may be supplied to the developing device via the discharge hole and the inlet of the mounting unit.

In some examples, the detecting unit 230 may acquire detection information corresponding to the amount of toner in the toner refill cartridge 20. For example, the detection information may be a detected value used to calculate the amount of toner in the toner refill cartridge 20. In some examples, the detecting unit 230 may be at least one of a capacitive sensor for detecting a capacitance between two electrodes, a piezoelectric sensor for detecting a frequency according to the amount of toner in the toner refill cartridge 20, a photosensor for detecting the transmittance of light, and a load detection unit for detecting a load of the toner refill cartridge 20. The amount of toner in the toner refill cartridge 20 may be determined based on the detected value acquired from the detecting unit 230. For example, the amount of toner in the toner refill cartridge 20 may be calculated based on a difference value between a detected value at a start time point of the supply of toner and a detected value at a certain time point after the start time point. For example, the detecting unit 230 or the controller 240 may determine the amount of toner in the toner refill cartridge 20 based on the detected value.

In some examples, the controller 240 may control the operation of the drive unit 220 based on the detected value corresponding to the amount of toner in the toner refill cartridge 20. For example, the controller 240 may determine the toner supply state from the toner refill cartridge 20 to the image forming apparatus 10 and may control the operation of the drive unit 220 corresponding to the toner supply state.

For example, the controller 240 may control the operation of the drive unit 220 based on the amount of toner in the toner refill cartridge 20 and the driving time of the drive unit 220. For example, the controller 240 may determine the toner supply state from the toner refill cartridge 20 to the image forming apparatus 10 and may control the operation of the drive unit 220 corresponding to the toner supply state based on the amount of toner in the toner refill cartridge 20 and the driving time of the drive unit 220.

In some examples, when the detected value corresponding to the amount of toner in the toner refill cartridge 20 is within a range of a reference value that is a reference for determining toner supply completion and the driving time of the drive unit 220 is within a range of a first reference time for normal toner supply completion, the controller 240 may determine the toner supply state to be a toner supply completion state and may control the drive unit 220 to stop operation. The detected value being "within a range" of the reference value can refer to the detected value being in a range that includes the reference value (e.g., the detected value is less than or equal to the reference value). Similarly, the driving time being "within a range" of the first reference time can refer to the driving time being in a range that includes the first reference time (e.g., the driving time is greater than equal to the first reference time). For example, when the detected value detected by the detecting unit 230 is within the range of the reference value or the amount of toner corresponding to the detected value is less than or equal to a reference amount and the driving time of the drive unit 220 is greater than or equal to a first reference time (e.g., 10 seconds), the drive unit 220 may stop providing the driving force to the toner refill cartridge 20. In response to determining the toner supply completion state, the shutter of the toner refill cartridge 20 may be closed, and the toner gauge may be updated. The toner refill cartridge 20 may be removed from the image forming apparatus 10.

In some examples, when the detected value corresponding to the amount of toner in the toner refill cartridge 20 is within the range of the reference value and the driving time of the drive unit 220 is not within the range of the first reference time, the controller 240 may determine the toner supply state to be a toner supply error state and may control the drive unit 220 to stop operation. For example, when the detected value detected by the detecting unit 230 is within the range of the reference value or the amount of toner corresponding to the detected value is less than or equal to the reference amount and the driving time of the drive unit 220 is less than the first reference time (e.g., 10 seconds), the drive unit 220 may stop providing the driving force to the toner refill cartridge 20. For example, an error may have occurred in the detecting unit 230 where the detecting unit 230 indicates there is no remaining amount of toner in the toner refill cartridge 20 even though the supply of toner is not completed. In response to determining the toner supply error state, the shutter of the toner refill cartridge 20 may be closed. The toner refill cartridge 20 may be removed from the image forming apparatus 10.

In further examples, when the detected value corresponding to the amount of toner in the toner refill cartridge 20 is not within the range of the reference value and the driving time of the drive unit 220 is within the range of a second reference time for predicting an abnormal supply of toner, the controller 240 may control the drive unit 220 so that the driving force transmitted to the toner refill cartridge 20 may be increased. For example, the second reference time may be larger than the first reference time.

As a specific example, when the detected value corresponding to the amount of toner in the toner refill cartridge 20 is not within the range of the reference value or the amount of toner corresponding to the detected value is greater than the reference amount, the driving time of the drive unit 220 is within the range of the second reference time and a number of initializations of the driving time of the drive unit 220 is not greater than a reference number of times, the controller 240 may increase a rotation speed of the drive unit 220 so that the driving force transmitted to the toner refill cartridge 20 may be increased. In this case, the controller 240 may determine that the toner in the toner refill cartridge 20 is compacted in the toner refill cartridge 20 so that the driving force transmitted to the toner refill cartridge 20 may be increased to cause the toner in the toner refill cartridge 20 to be smoothly supplied to the developing device. The controller 240 may initialize the driving time of the drive unit 220 and may monitor the amount of toner in the toner refill cartridge 20. The controller 240 may record the number of initializations of the driving time of the drive unit 220 as the driving time of the drive unit 220 is initialized. The controller 240 may check whether the detected value corresponding to the amount of toner in the toner refill cartridge 20 is within the range of the reference value.

On the other hand, when the detected value corresponding to the amount of toner in the toner refill cartridge 20 is not within the range of the reference value or the amount of toner corresponding to the detected value is greater than the reference value, the driving time of the drive unit 220 is within the range of the second reference time and the number of initializations of the driving time of the drive unit 220 is greater than the reference number of times, the controller 240 may determine the toner supply state to be a toner supply error state. That is, when the supply of toner is not completed even when the supply of toner is attempted because the number of initializations of the driving time is greater than the reference number of times, the controller 240 may determine the toner supply state to be a toner supply error state. Subsequently, the controller 240 may control the drive unit 220 to stop operation.

In further examples, when the detected value corresponding to the amount of toner in the toner refill cartridge 20 is not within the range of the reference value and the driving time of the drive unit 220 is not within the range of the second reference time, the controller 240 may determine the toner supply state to be a toner supply incomplete state. In this case, the controller 240 that controls the toner refill cartridge 20 may determine that toner in the toner refill cartridge 20 is being supplied to the developing device and maintain the provision of the driving force to the toner refill cartridge 20. The controller 240 may check whether the detected value corresponding to the amount of toner in the toner refill cartridge 20 is within the range of the reference value.

In some examples, as the toner is supplied from the toner refill cartridge 20 to the developing device, the controller 240 may calculate the change in the amount of toner in the toner refill cartridge 20 based on detection information acquired from the detecting unit 230.

For example, the detecting unit 230 may include at least one of a capacitive sensor for detecting a capacitance between two electrodes, a piezoelectric sensor for detecting a frequency according to the amount of toner in the toner refill cartridge 20, a photosensor for detecting the transmittance of light, and a load detecting unit 230 for detecting a load of the toner refill cartridge 20.

In some examples, when it is determined that the toner supply state is the toner supply completion state or the toner supply error state, the controller 240 may control the drive unit 220 to stop operation, and may perform an operation of removing the toner refill cartridge 20. When it is determined that the toner supply state is the toner supply incomplete state, the controller 240 may control the driving operation of the drive unit 220.

Figure 3:
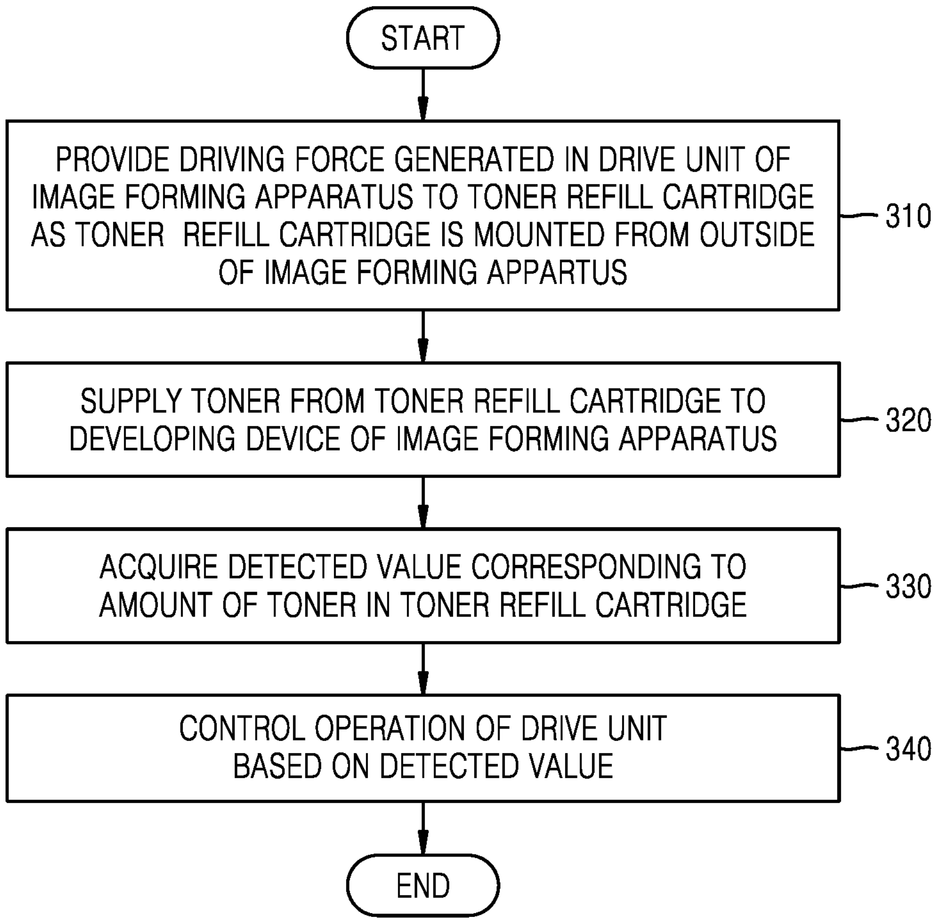
FIG. 3 is a flowchart of an example illustrating an operating method of an image forming apparatus, whereby a toner supply state is detected as the toner is supplied to the image forming apparatus in a toner refill cartridge.

FIG. 3 is a flowchart of an example operating method of the image forming apparatus 10, in which a toner supply state is detected as toner is supplied from the toner refill cartridge 20 to the image forming apparatus 10.

Referring to FIG. 3, in Operation 310, the image forming apparatus 10 may provide a driving force generated in the drive unit of the image forming apparatus 10 to the toner refill cartridge 20 when the toner refill cartridge 20 is mounted from the outside of the image forming apparatus 10.

In Operation 320, the image forming apparatus 10 may supply the toner to the developing device of the image forming apparatus 10 from the toner refill cartridge 20. For example, the discharge hole of the toner refill cartridge 20 may be opened, and the toner may be supplied to the developing device via the discharge hole of the toner refill cartridge 20 and the inlet of the mounting unit.

In Operation 330, the image forming apparatus 10 may acquire a detected value corresponding to the amount of toner in the toner refill cartridge 20. For example, the image forming apparatus 10 may acquire the detected value corresponding to the amount of toner in the toner refill cartridge 20 from the detecting unit 230 as toner is supplied from the toner refill cartridge 20 to the developing device. In some examples, the image forming apparatus 10 may calculate the amount of toner in the toner refill cartridge 20 based on the detected value. For example, the image forming apparatus 10 may calculate the amount of toner in the toner refill cartridge 20 based on the amount of change in the detected value at the start time point of the supply of toner and a certain time point.

In Operation 340 of the image forming apparatus 10, the image forming apparatus 10 may control the operation of the drive unit based on the detected value corresponding to the amount of toner in the toner refill cartridge 20.

Figure 4:
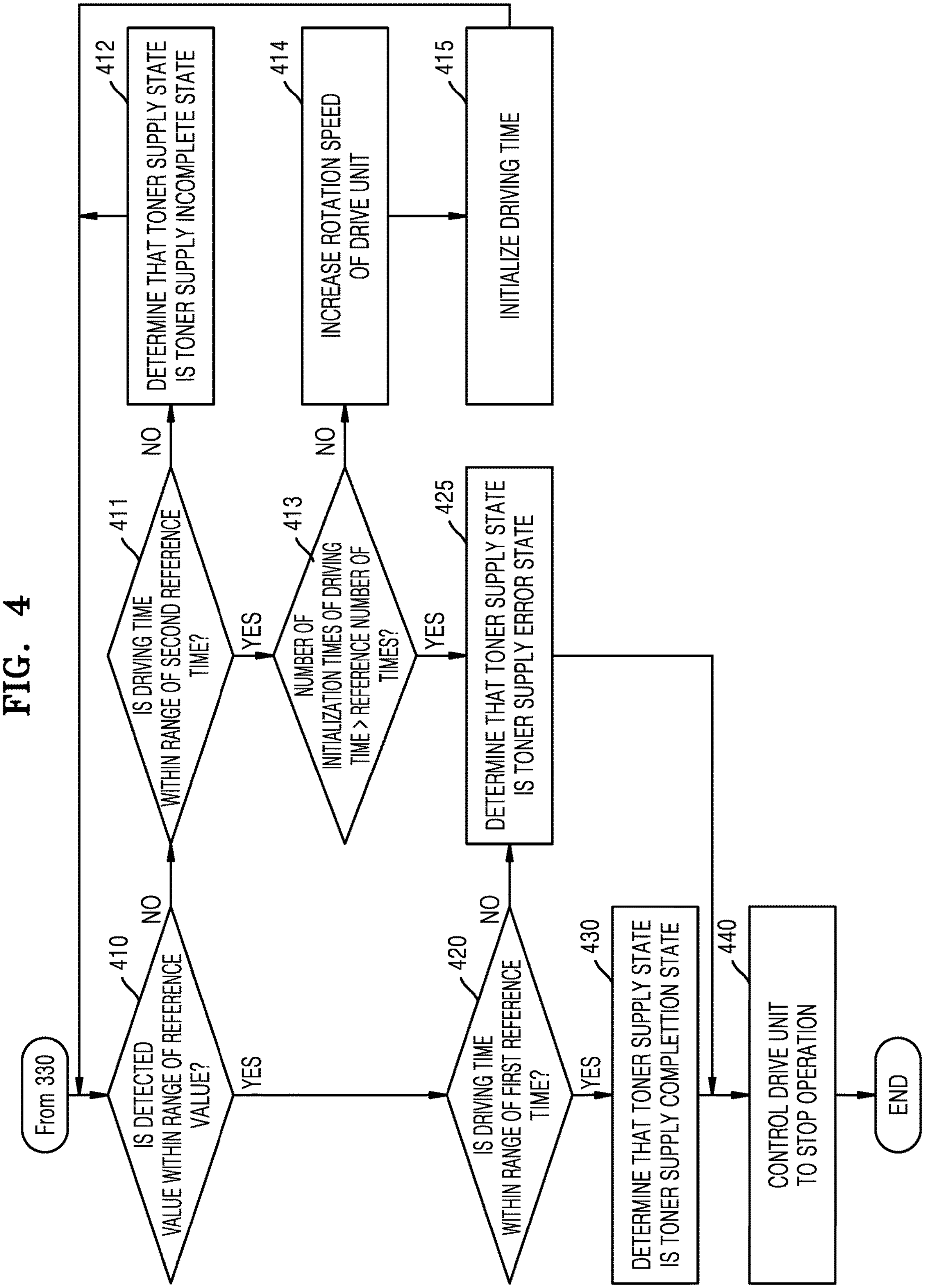
FIG. 4 is a flowchart of an example illustrating an operating method of an image forming apparatus, whereby a toner supply state is detected.

The image forming apparatus 10 may control the operation of the drive unit based on the detected value corresponding to the amount of toner in the toner refill cartridge 20 and the driving time of the drive unit FIG. 4 is a flowchart of another example operating method of the image forming apparatus 10, in which a toner supply state is detected.

Referring to FIG. 4, in Operation 410, the image forming apparatus 10 may check whether the detected value corresponding to the amount of toner in the toner refill cartridge 20 is within the range of a reference value that is a reference for determining toner supply completion. A process of detecting the amount of toner in a cartridge based on a detected value acquired by a detecting unit will be described with reference to FIGS. 5A through 8.

When the detected value corresponding to the amount of toner in the toner refill cartridge 20 is within the range of the reference value, the image forming apparatus 10 may perform Operation 420. When the amount of toner in the toner refill cartridge 20 is not within the range of the reference value, the image forming apparatus 10 may perform Operation 411.

In Operation 420, the image forming apparatus 10 may check whether a driving time of a drive unit is within the range of the first reference time for normal toner supply completion. For example, the first reference time may be set based on a speed at which the toner is supplied from the toner refill cartridge 20 to the developing device, and the amount of toner charged in the toner refill cartridge 20.

When the driving time is within the range of the first reference time, the image forming apparatus 10 may determine that the toner supply state is a toner supply completion state, according to Operation 430 of the image forming apparatus 10. When it is determined that the toner supply state is the toner supply completion state, the image forming apparatus 10 may control the drive unit 220 to stop operation according to Operation 440 of the image forming apparatus 10. Subsequently, the toner refill cartridge 20 may be removed from the image forming apparatus 10. Also, the image forming apparatus 10 may update the toner gauge by the supply of toner.

When the driving time is not within the range of the first reference time (as determined at Operation 420), the image forming apparatus 10 may determine that the toner in the toner refill cartridge 20 is not normally supplied to the developing device, according to Operation 425 of the image forming apparatus 10, and may determine that the toner supply state is a toner supply error state. When it is determined that the toner supply state is the toner supply error state, the image forming apparatus 10 may control the drive unit 220 to stop operation according to Operation 440 of the image forming apparatus 10. Subsequently, the toner refill cartridge 20 may be removed from the image forming apparatus 10.

On the other hand, when the detected value corresponding to the amount of toner in the toner refill cartridge 20 to be monitored is not within the range of the reference value (as determined at Operation 410), the toner in the toner refill cartridge 20 may be still being supplied to the developing device, or an error may occur in the supply of toner. In order to determine the toner supply incomplete state or the toner supply error state, in Operation 411 of the image forming apparatus 10, the image forming apparatus 10 may check whether the driving time of the drive unit is within the range of the second reference time for predicting the abnormal supply of toner. For example, the second reference time may be set to be larger than the first reference time. For example, when the first reference time is 10 seconds, the second reference time may be 25 seconds.

When the driving time is not within the range of the second reference time, the image forming apparatus 10 may determine the toner supply state to be a toner supply incomplete state according to Operation 412 of the image forming apparatus 10. The drive unit 220 of the image forming apparatus 10 may maintain provision of the driving force to the toner refill cartridge 20. The image forming apparatus 10 may monitor whether the amount of toner in the toner refill cartridge 20 is within the range of the reference value.

When the driving time is within the range of the second reference time (as determined at Operation 411), the image forming apparatus 10 may check whether the number of initializations of the driving time is greater than a reference number of times, according to Operation 413 of the image forming apparatus 10. When the number of initializations of the driving time is greater than the reference number of times, the image forming apparatus 10 may determine the toner supply state to be the toner supply error state according to Operation 425 of the image forming apparatus 10. That is, when the supply of toner is not completed even when the supply of toner is attempted because the number of initializations of the driving time is greater than the reference number of times, the image forming apparatus 10 may determine that an error has occurred in the toner refill cartridge 20 or the developing device, and may determine that the toner supply state is the toner supply error state. Subsequently, the image forming apparatus 10 may control the drive unit 220 to stop operation according to Operation 440 of the image forming apparatus 10. The toner refill cartridge 20 may be removed from the image forming apparatus 10.

On the other hand, when the number of initializations of the driving time is not greater than the reference number of times (as determined at Operation 413), the image forming apparatus 10 may increase the rotation speed of the drive unit according to Operation 414 of the image forming apparatus 10. That is, when the number of initializations of the driving time is not greater than the reference number of times, the image forming apparatus 10 may determine that the toner in the toner refill cartridge 20 is compacted in the toner refill cartridge 20, and the image forming apparatus 10 may increase the driving force transmitted to the toner refill cartridge 20, so that toner in the toner refill cartridge 20 may be smoothly supplied to the developing device. The image forming apparatus 10 may initialize the driving time of the drive unit according to Operation 415 of the image forming apparatus 10. The image forming apparatus 10 may monitor whether the detected value corresponding to the amount of toner in the toner refill cartridge 20 is within the range of the reference value.

Figure 5A:
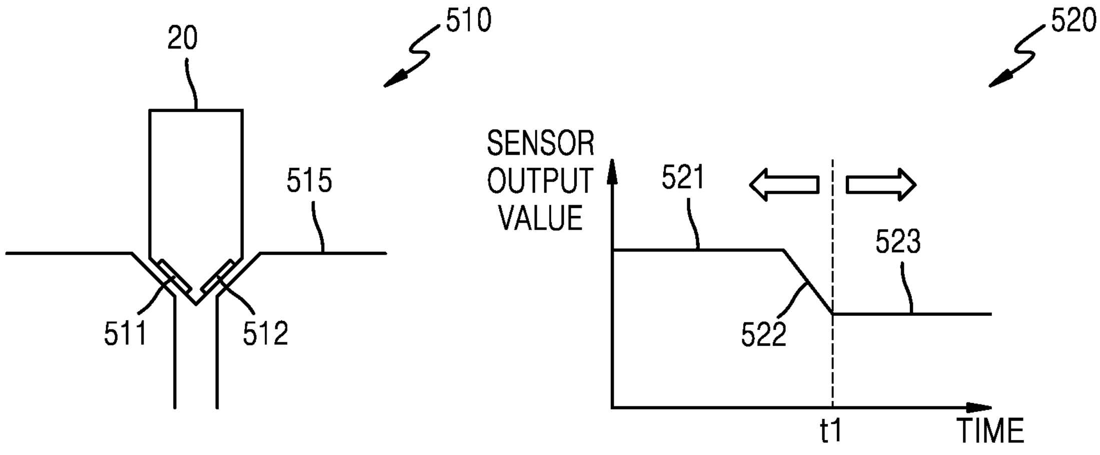
FIG. 5A is a view of an example for describing a process of detecting an amount of toner in the toner refill cartridge when a detecting unit is a capacitive sensor.

FIG. 5A is a view of an example for describing a process of detecting the amount of toner in a toner refill cartridge when the detecting unit 230 includes a capacitive sensor.

The capacitive sensor may detect a capacitance between two electrodes. The capacitive sensor may provide a value of the detected capacitance to the controller 240. The controller 240 may calculate the amount of toner in the toner refill cartridge 20 based on the value of the capacitance. For example, the capacitive sensor may detect a value of a capacitance at a start time point at which the toner is supplied from the toner refill cartridge 20 to the developing device and the value of the capacitance at another certain time point. For example, the controller 240 may calculate the amount of toner in the toner refill cartridge 20 based on a difference value between a value of the capacitance at the start time point at which toner is supplied, and a value of the capacitance at the certain time point. For example, the controller 240 may calculate the amount of change in the value of the capacitance at the start time point at which toner is supplied, and the value of the capacitance at the certain time point. The controller 240 may detect the remaining amount of toner in the toner refill cartridge 20 according to the amount of change.

An image 510 of FIG. 5A illustrates a case where two electrodes 511 and 512 are mounted in the vicinity of the discharge hole of the toner refill cartridge 20. For example, the position of the first electrode 511 and the position of the second electrode 512 may be symmetrical to each other.

A graph 520 of FIG. 5A illustrates an output value of the capacitive sensor as toner is supplied from the toner refill cartridge 20 to the developing device. For example, because the remaining amount of toner in the toner refill cartridge 20 is reduced as toner is supplied from the toner refill cartridge 20 to the developing device, a value of the capacitance may be reduced.

For example, a sensor output value 521 and a sensor output value 522 may be sensor values while the toner is discharged from the toner refill cartridge 20 to the developing device, prior to time t1. The sensor output value 523 may be a sensor value when discharging of toner from the toner refill cartridge 20 to the developing device is completed.

For example, a difference value between the sensor output value 521 and the sensor output value 523 may be within the range of a first reference value that is a reference for determining the completion of the supply of toner. For example, the first reference value may be 50. When discharging of the toner from the toner refill cartridge 20 to the developing device is completed, the difference value between the sensor output value 521 and the sensor output value 523 may be greater than or equal to 50.

For example, the controller 240 may detect the amount of toner in the toner refill cartridge 20 from a sensor value acquired from the capacitive sensor.

The image forming apparatus 10 may determine a toner supply state based on the result of comparing a sensor output value detected by the capacitive sensor with a reference value or the result of comparing the amount of toner corresponding to the sensor output value with a reference amount and may control the operation of the drive unit 220 according to the determined toner supply state.

Figure 5B:
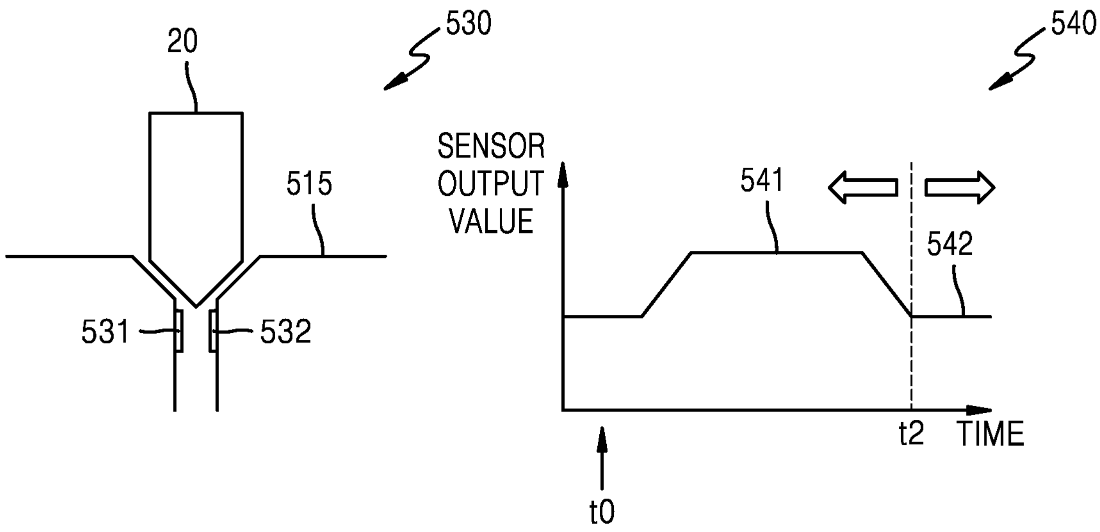
FIG. 5B is a view of another example for describing a process of detecting an amount of toner in the toner refill cartridge when the detecting unit is a capacitive sensor.

FIG. 5B is a view of another example for describing a process of detecting the amount of toner in a toner refill cartridge 20 when the detecting unit 230 includes a capacitive sensor.

An image 530 of FIG. 5B illustrates a case where two electrodes 531 and 532 are mounted on a connector 515 for accommodating the discharge hole of the toner refill cartridge 20.

A graph 540 of FIG. 5B illustrates an output value of the capacitive sensor of FIG. 5B as the toner is supplied from the toner refill cartridge 20 to the developing device. For example, a sensor output value 541 may be a sensor value while toner is being discharged from the toner refill cartridge 20 to the developing device prior to time t2. A sensor output value 543 may be a sensor value when discharging of toner from the toner refill cartridge 20 to the developing device is completed.

Figure 6:
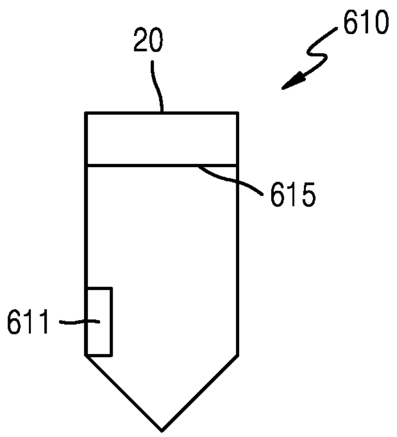
FIG. 6 is a view of an example for describing a process of detecting an amount of the toner in the toner refill cartridge when the detecting unit is a piezoelectric sensor.
Figure 6:
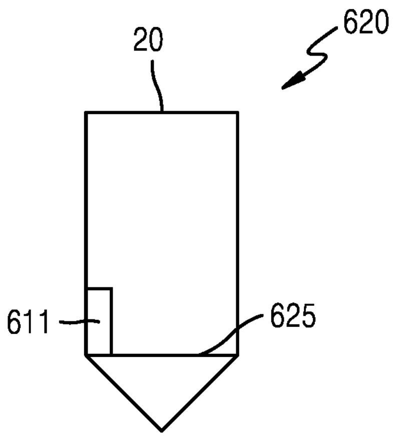

FIG. 6 is a view of an example for describing a process of detecting the amount of toner in the toner refill cartridge 20 when the detecting unit 230 includes a piezoelectric sensor.

The piezoelectric sensor may detect a frequency according to the amount of toner in the toner refill cartridge 20. For example, the controller 240 may calculate the amount of toner in the toner refill cartridge 20 based on the frequency acquired by the piezoelectric sensor. For example, the piezoelectric sensor may detect a frequency at a start time point at which the toner is supplied from the toner refill cartridge 20 to the developing device, and a frequency at another certain time point. The controller 240 may calculate the amount of toner in the toner refill cartridge 20 based on a difference value between the frequency at the start time point at which toner is supplied, and the frequency at the certain time point. For example, the controller 240 may calculate the amount of change between the frequency at the start time point at which toner is supplied, and the frequency at the certain time point. The controller 240 may detect the remaining amount of toner in the toner cartridge 20 based on the amount of change.

An image 610 of FIG. 6 illustrates a case where the toner refill cartridge 20 is full with toner. For example, the line 615 may be a line corresponding to a full amount of toner in the toner refill cartridge 20. In some examples, the piezoelectric sensor 611 may be mounted in the vicinity of the discharge hole of the toner refill cartridge 20. The piezoelectric sensor 611 may acquire a frequency when the supply of toner from the toner refill cartridge 20 to the developing device starts.

An image 620 of FIG. 6 illustrates a case where the supply of toner from the toner refill cartridge 20 to the developing device is completed. For example, the remaining amount of toner in the toner refill cartridge 20 when the supply of toner is normally completed, may be the amount of toner when the charging amount of toner in the toner refill cartridge 20 is less than 3%. For example, a line 625 may be a line corresponding to the remaining amount of toner in the toner refill cartridge 20 when the supply of toner is completed. The piezoelectric sensor 611 may acquire a frequency when the supply of toner is completed. For example, the frequency when the supply of toner is completed may be used as a reference value that is a reference for determining the completion of the supply of toner. For example, the piezoelectric sensor may acquire a frequency at a certain time point after the supply of toner starts from the toner refill cartridge 20. The controller 240 may determine a toner supply state based on the result of comparing the frequency at the certain time point and the reference value. For example, when the frequency at the certain time point is less than or equal to the reference value, the controller 240 may determine that the toner supply state is a toner supply completion state. Also, when the frequency at the certain time point is greater than the reference value, the controller 240 may determine that the toner supply state is a toner supply incomplete state.

For example, the controller 240 may calculate a difference value between a frequency when the supply of toner starts and a frequency when the supply of toner is completed. For example, the difference value may be used as a reference value that is a reference for determining the completion of the supply of toner. For example, the piezoelectric sensor may acquire a frequency at a certain time point after the supply of toner starts from the toner refill cartridge 20. The controller 240 may calculate a difference value between a frequency when the supply of toner starts and a frequency at a certain time point and may determine a toner supply state based on the result of comparting the difference value and the reference value. For example, when the difference value is greater than or equal to the reference value, the controller 240 may determine that the toner supply state is the toner supply completion state. Also, when the difference value is less than the reference value, the controller 240 may determine that the toner supply state is the toner supply incomplete state.

The image forming apparatus 10 may determine the toner supply state based on the result of comparing the frequency detected by the piezoelectric sensor with the reference value or the result of comparing the amount of toner corresponding to the frequency and the reference amount and may control the operation of the drive unit 220 according to the determined toner supply state.

Figure 7:
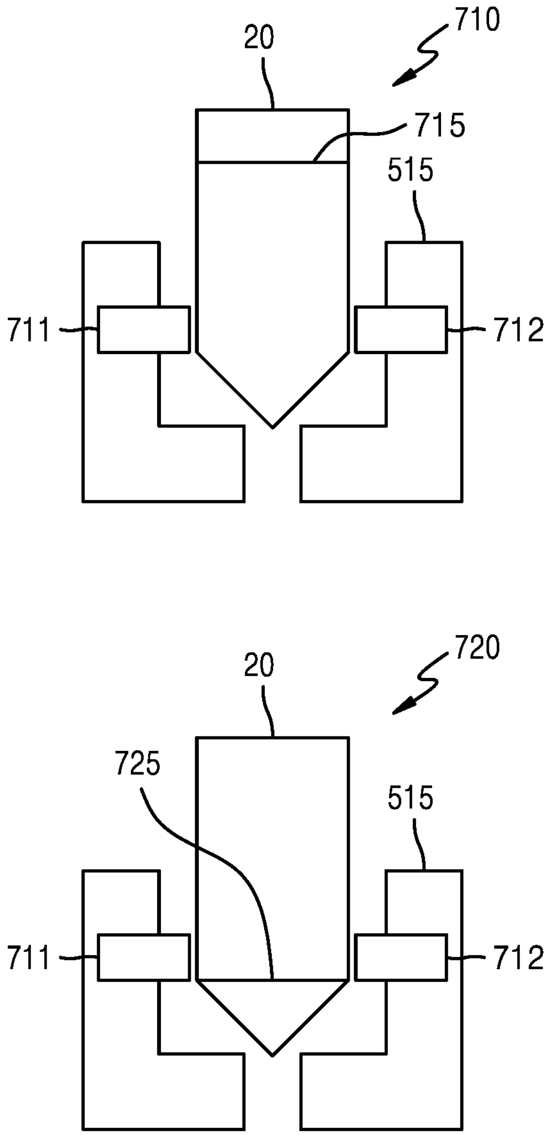
FIG. 7 is a view of an example for describing a process of detecting an amount of the toner in the toner refill cartridge when the detecting unit is a photosensor.

FIG. 7 is a view of an example for describing a process of detecting the amount of toner in the toner refill cartridge 20 when the detecting unit 230 includes a photosensor.

The photosensor may transmit light through the toner refill cartridge 20 and may detect the transmittance of light. For example, the controller 240 may calculate the amount of toner in the toner refill cartridge 20 based on the transmittance of light. For example, the photosensor may include an emission unit that emits light and a light receiving unit that receives light.

Referring to an image 710 of FIG. 7, the photosensor may be mounted on the connector 515 for accommodating the discharge hole of the toner refill cartridge 20. For example, an emission unit 711 of the photosensor may be mounted on a first side of the connector 515, and a light receiving unit 712 of the photosensor may be mounted on an opposite side that is opposite the first side of the connector 515. When the emission unit 711 emits light toward the toner refill cartridge 20, the light receiving unit 712 may receive light passing through the toner refill cartridge 20. The photosensor may detect the transmittance of light passing through the toner refill cartridge 20. For example, the controller 240 may calculate the amount of toner in the toner refill cartridge 20 based on the transmittance of light. For example, the controller 240 may calculate the amount of toner in the toner refill cartridge 20 based on a difference value between the transmittance of light at the start time point at which toner is supplied from the toner refill cartridge 20 to the developing device and the transmittance of light at a certain time point.

An image 710 of FIG. 7 illustrates a case where the toner refill cartridge 20 is full with toner. For example, a line 715 may be a line corresponding to a full amount of toner in the toner refill cartridge 20. For example, the photosensor may acquire the transmittance of light at the start time point at which toner is supplied from the toner refill cartridge 20 to the developing device.

An image 720 of FIG. 7 illustrates a case where the supply of toner from the toner refill cartridge 20 to the developing device is completed. For example, the remaining amount of toner in the toner refill cartridge 20 when the supply of toner is normally completed, may be the amount of toner when the charging amount of the toner in the toner refill cartridge 20 is less than 3%. For example, a line 725 may be a line corresponding to the remaining amount of toner in the toner refill cartridge 20 when the supply of toner is completed. The photosensor may acquire the transmittance of light when the supply of toner is completed. For example, the transmittance of light when the supply of toner is completed, may be used as a reference value that is a reference for determining the completion of the supply of toner.

For example, the photosensor may acquire the transmittance of light at a certain time point after the supply of toner from the toner refill cartridge 20 starts. The controller 240 may determine the toner supply state based on the result of comparing the transmittance of light at the certain time point with the reference value. For example, when the transmittance of light at the certain time point is greater than or equal to the reference value, the controller 240 may determine that the toner supply state is a toner supply completion state. Also, when the transmittance of light at the certain time point is less than or equal to the reference value, the controller 240 may determine that the toner supply state is the toner supply incomplete state.

For example, the controller 240 may calculate a difference value between the transmittance of light when the supply of toner starts and the transmittance of light when the supply of toner is completed. For example, the difference value may be a reference value that is a base for determining the completion of the supply of toner. For example, the photosensor may acquire the transmittance of light at a certain time point after the supply of toner starts from the toner refill cartridge 20. The controller 240 may acquire the transmittance of light when the supply of toner starts and light transmittance at a certain time point. The controller 240 may calculate a difference value between the transmittance of light when the supply of toner starts and the transmittance of light at a certain time point and may determine a toner supply state based on the result of comparing the difference value with the reference value. For example, when the difference value is greater than the reference value, the controller 240 may determine that the toner supply state is a toner supply completion state. Also, when the difference value is greater than or equal to the reference value, the controller 240 may determine that the toner supply state is the toner supply completion state. Also, when the difference value is less than the reference value, the controller 240 may determine that the toner supply state is the toner supply incomplete state.

The image forming apparatus 10 may determine the toner supply state based on the result of comparing the transmittance of light detected by the photosensor with the reference value or the result of comparing the amount of toner corresponding to the transmittance of light with the reference amount and may control the operation of the drive unit 220 according to the determined toner supply state.

Figure 8:
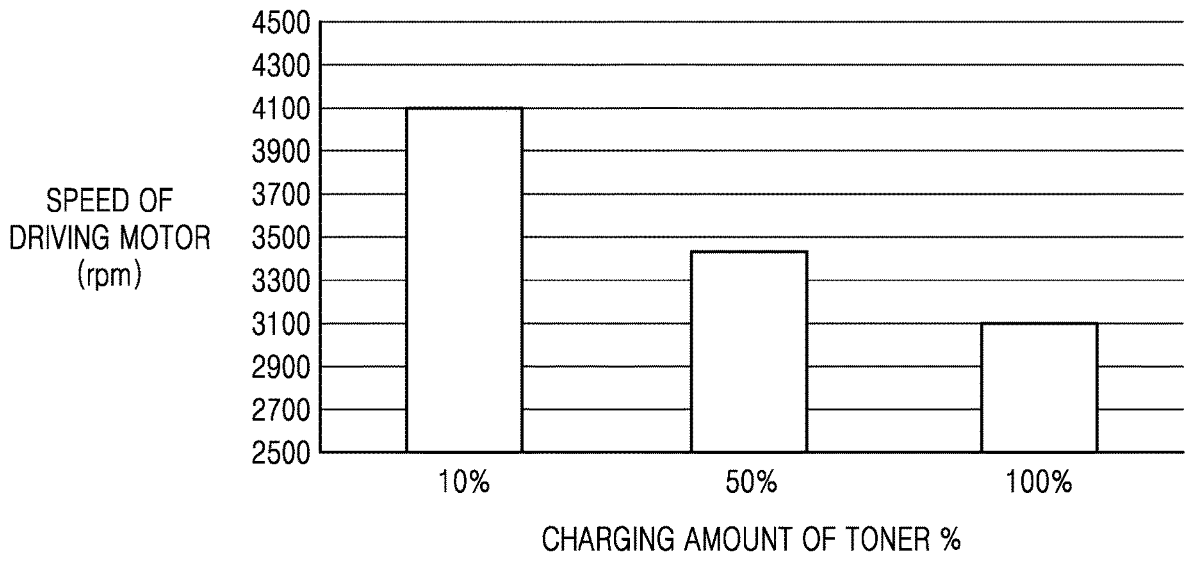
FIG. 8 is a graph illustrating the speed of a driving motor with respect to a toner charging amount of the toner refill cartridge.

FIG. 8 is a graph illustrating the speed of a driving motor with respect to a toner charging amount of the toner refill cartridge 20.

For example, the detecting unit 230 may include a load detecting unit that detects a load of the toner refill cartridge 20. The graph of FIG. 8 illustrates the speed of the driving motor according to the charging amount of toner in the toner refill cartridge 20. Here, the driving motor may provide a driving force to the toner refill cartridge 20 so as to supply toner from the toner refill cartridge 20 to the developing device. For example, as the charging amount of toner in the toner refill cartridge 20 increases, the speed of the driving motor may be lower. On the other hand, the smaller charging amount of toner in the toner refill cartridge 20 is, the higher the speed of the driving motor may be.

For example, the speed of the driving motor when the charging amount of toner in the toner refill cartridge 20 is less than 3%, may be used as a reference value. For example, the load detecting unit may acquire the speed of the driving motor at a certain time point after the supply of toner starts from the toner refill cartridge 20. When the speed of the driving motor is greater than or equal to the reference value, the controller 240 may determine that that the toner supply state is the toner supply completion state. Also, when the speed of the driving motor is less than the reference value, the controller 240 may determine that the toner supply state is a toner supply incomplete state.

The image forming apparatus 10 may determine the toner supply state based on the result of comparing the speed of the driving motor with the reference value or the result of comparing the amount of toner corresponding to the speed of the driving motor with the reference amount and may control the operation of the drive unit 220 according to the determined toner supply state.

Figure 9:
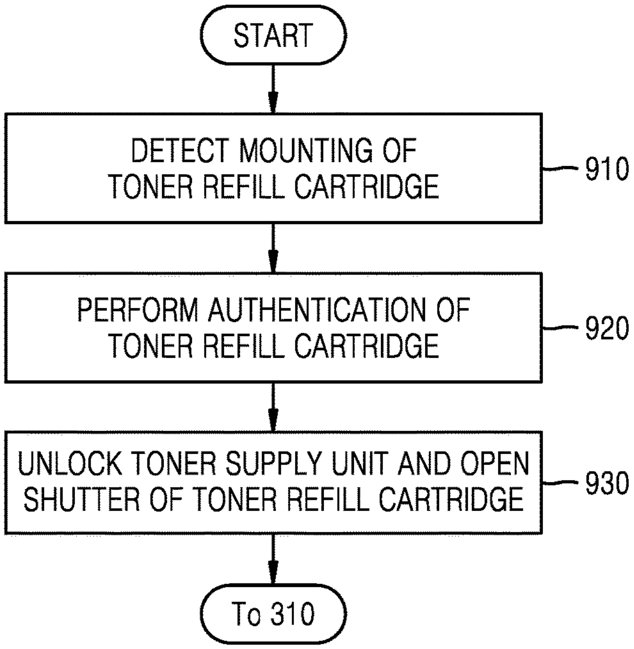
FIG. 9 is a flowchart of an example illustrating an operating method of an image forming apparatus according to mounting of the toner refill cartridge.

FIG. 9 is a flowchart of an example illustrating an operating method of the image forming apparatus 10 according to the mounting of a toner refill cartridge.

Referring to FIG. 9, in Operation 910, the image forming apparatus 10 may detect the mounting of the toner refill cartridge 20. For example, the toner refill cartridge 20 may be mounted on the mounting unit of the image forming apparatus 10 through the housing provided with a communication hole in the body of the image forming apparatus 10.

In Operation 920, the image forming apparatus 10 may perform authentication of the toner refill cartridge 20. For example, the image forming apparatus 10 may acquire identification information on the toner refill cartridge 20 from a chip of the toner refill cartridge 20 and may check whether the toner refill cartridge 20 is genuine based on the identification information. When the toner refill cartridge 20 is genuine, the image forming apparatus 10 may perform an operation of supplying toner from the toner refill cartridge 20 to the developing device.

In Operation 930, the image forming apparatus 10 may unlock the toner supply unit and open the shutter of the toner refill cartridge 20. That is, the image forming apparatus 10 may open the shutter of the toner refill cartridge 20 and unlock the toner supply unit connected to the developing device so that toner may be supplied to the developing device of the image forming apparatus 10 through the discharge hole of the toner refill cartridge 20. Subsequently, the image forming apparatus 10 may control a toner supply operation from the toner refill cartridge 20 to the developing device by using the driving force provided from the drive unit.

Figure 10:
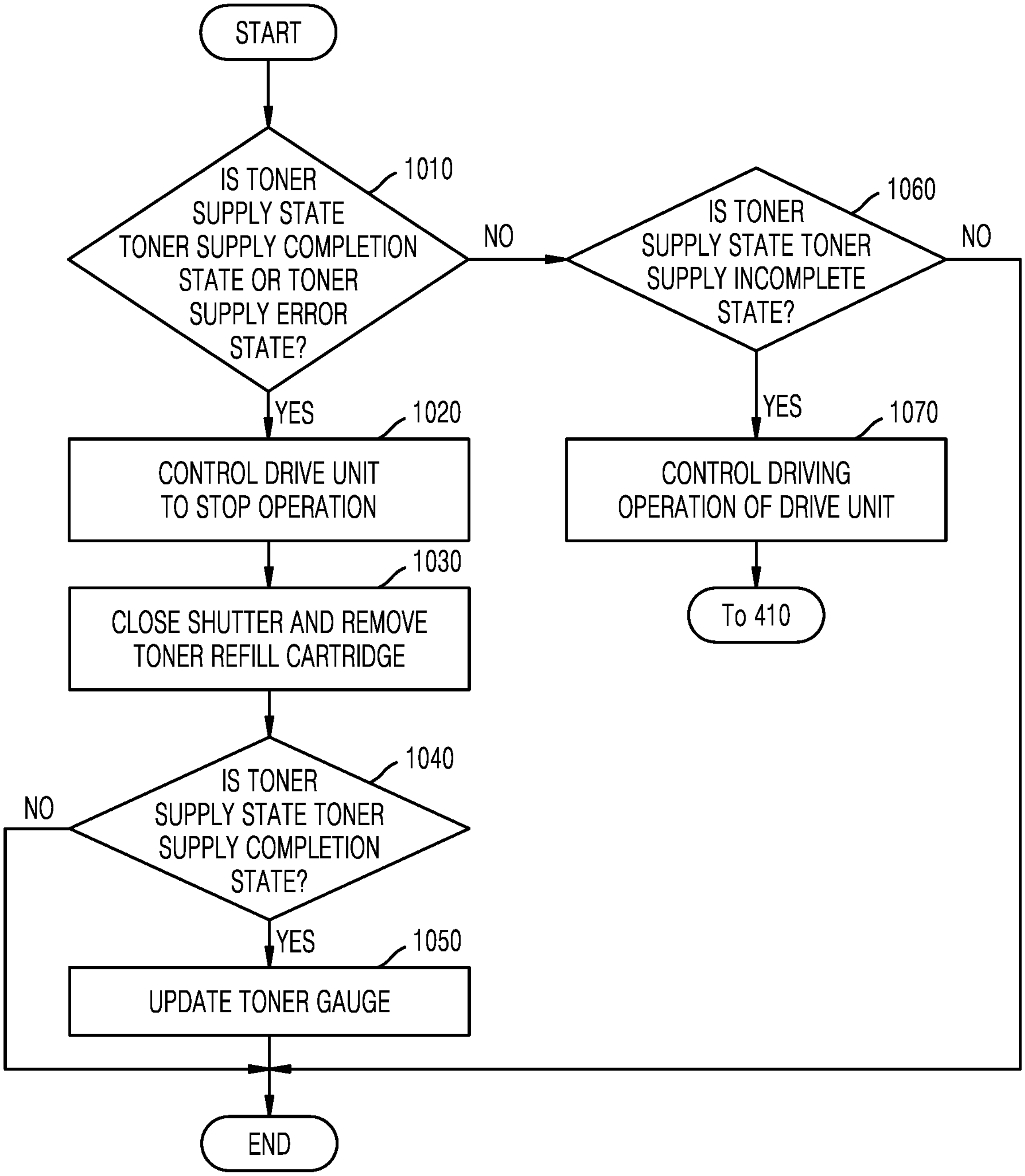
FIG. 10 is a flowchart of an example illustrating an operating method of an image forming apparatus according to the result of detecting the toner supply state.

FIG. 10 is a flowchart of an example operating method of the image forming apparatus 10 according to the result of detecting a toner supply state.

In Operation 1010, the image forming apparatus 10 may check whether the toner supply state is a toner supply completion state or a toner supply error state. When the toner supply state is the toner supply completion state or the toner supply error state, the image forming apparatus 10 may control the drive unit 220 to stop operation according to Operation 1020.

In Operation 1030, the image forming apparatus 10 may close the shutter of the toner refill cartridge 20. When the toner refill cartridge 20 is removed from the image forming apparatus 10, the image forming apparatus 10 may detect the removal of the toner refill cartridge 20.

In Operation 1040, the image forming apparatus 10 may check whether the toner supply state is the toner supply completion state. When the toner supply state is the toner supply completion state, the image forming apparatus 10 may update the toner gauge according to Operation 1050 of the image forming apparatus 10.

In Operation 1010, when it is determined that the toner supply state is not the toner supply completion state and the toner supply error state, the image forming apparatus 10 may check whether the toner supply state is the toner supply incomplete state according to Operation 1060 of the image forming apparatus 10. When it is determined that the toner supply state is the toner supply incomplete state, the image forming apparatus 10 may control a driving operation of the drive unit 220 according to Operation 1070. Subsequently, the image forming apparatus 10 may perform Operation 410 of the image forming apparatus 10 of FIG. 4.

Figure 11:
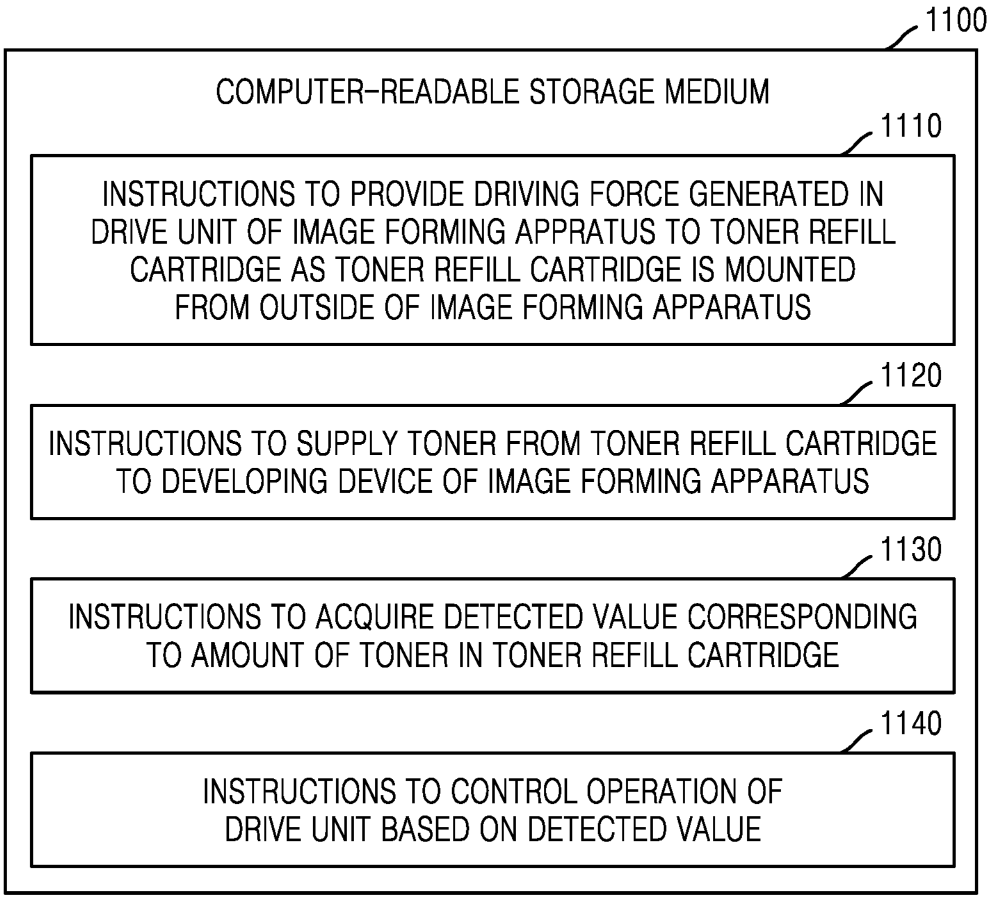
FIG. 11 is a view of an example for describing instructions stored in a computer-readable storage medium.

FIG. 11 is a view of an example computer-readable storage medium 1100 storing instructions.

The instructions stored in the computer-readable storage medium 1100 shown in FIG. 11 control an operating method of the image forming apparatus 10, in which a driving force is delivered to the toner refill cartridge 20 to start the supply of toner and the operation of the drive unit 220 is controlled based on a detected value corresponding to the amount of toner in the toner refill cartridge 20 as the toner is supplied from the toner refill cartridge 20. For example, the computer-readable storage medium 1100 may store instructions 1110 for providing the driving force generated in the drive unit 220 of the image forming apparatus 10 to the toner refill cartridge 20 as the toner refill cartridge 20 is mounted from the outside of the image forming apparatus 10, instructions 1120 for supplying toner to the developing device of the image forming apparatus 10 from the toner refill cartridge 20, instructions 1130 for acquiring a detected value corresponding to the amount of toner in the toner refill cartridge 20, and instructions 1140 for controlling the operation of the drive unit based on the detected value.

Meanwhile, the operating method of the image forming apparatus 10 may be implemented in the form of a computer-readable storage medium for storing an instruction or data that may be executed by a computer or processor. The operating method of the image forming apparatus 10 may be written as a program that may be executed on the computer, and may be implemented in general-purpose digital computer that operates such a program by using the computer-readable storage medium. Such computer-readable storage media may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, or solid state disks (SSDs), and may store instructions or software, related data, data files, and data structures, and may be any device that may provide instructions or software, related data, data files and data structures to the processor or computer so that the processor or computer may execute the instructions.

As described above, although the embodiments have been described with reference to the limited embodiments and drawings, various modification and variations are possible from the above description by those skilled in the art. For example, even when the described techniques are performed in an order different from the described method and/or the described components of the system, structure, apparatus, circuit, etc. are coupled or combined in a different form than the described method or replaced or substituted by other components or equivalents, an appropriate result may be achieved.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. An image forming apparatus comprising:

a body comprising a developing device, a mounting unit from which a toner refill cartridge is detachable, wherein the mounting unit is connected to the developing device and is to deliver a toner in the toner refill cartridge to the developing device, the body comprising a housing having a communication hole so that the toner refill cartridge is to mount on the mounting unit from outside the image forming apparatus;

a drive unit to provide a driving force to the toner refill cartridge so that the toner is supplied from the toner refill cartridge to the developing device;

a detecting unit to acquire a detected value corresponding to an amount of the toner in the toner refill cartridge; and a controller to control an operation of the drive unit based on the detected value, wherein the controller is to control the drive unit to stop operation and close a shutter of the toner refill cartridge, and detect removal of the toner refill cartridge when the toner refill cartridge is removed from the image forming apparatus.

2. The image forming apparatus of claim 1, wherein the controller is to control the operation of the drive unit based on the detected value and a driving time of the drive unit.

3. The image forming apparatus of claim 2, wherein, in response to the detected value being within a range of a reference value and the driving time being within a range of a first reference time, the controller is to control the drive unit to stop operation.

4. The image forming apparatus of claim 3, wherein, in response to the detected value being within the range of the reference value and the driving time not being within the range of the first reference time, the controller is to control the drive unit to stop operation.

5. The image forming apparatus of claim 3, wherein, in response to the detected value not being within the range of the reference value and the driving time being within a range of a second reference time, the controller is to control the drive unit to increase the driving force to the toner refill cartridge.

6. The image forming apparatus of claim 5, wherein, in response to the detected value not being within the range of the reference value and the driving time not being within the range of the second reference time, the controller is to monitor an amount of toner in the toner refill cartridge.

7. The image forming apparatus of claim 5, wherein, in response to a number of initializations of the driving time being less than a reference number of times, the controller is to increase a rotation speed of the drive unit and initialize the driving time.

8. The image forming apparatus of claim 7, wherein, in response to the number of initializations of the driving time being greater than the reference number of times, the controller is to control the drive unit to stop operation.

9. The image forming apparatus of claim 1, wherein the detecting unit comprises at least one of:

- a capacitive sensor to detect a capacitance between electrodes,
- a piezoelectric sensor to detect a frequency according to an amount of toner in the toner refill cartridge,
- a photosensor to detect a transmittance of light, or
- a load detecting unit to detect a load of the toner refill cartridge.

10. A method of operating an image forming apparatus, the method comprising:

- providing a driving force generated in a drive unit of the image forming apparatus to a toner refill cartridge when the toner refill cartridge is mounted from outside of the image forming apparatus;
- supplying a toner from the toner refill cartridge to a developing device of the image forming apparatus;
- acquiring a detected value corresponding to an amount of toner in the toner refill cartridge;
- controlling an operation of the drive unit based on the detected value;
- controlling the drive unit to stop operation and close a shutter of the toner refill cartridge; and
- detecting removal of the toner refill cartridge when the toner refill cartridge is removed from the image forming apparatus.

11. The method of claim 10, wherein the controlling of the operation of the drive unit is further based on a driving time of the driving unit.

12. The method of claim 11, wherein the controlling of the operation of the drive unit comprises:

- in response to the detected value being within a range of a reference value and the driving time being within a range of a first reference time, controlling the drive unit to stop operation; and
- in response to the detected value being within the range of the reference value and the driving time not being within the range of the first reference time, controlling the drive unit to stop operation.

13. The method of claim 12, wherein the controlling of the operation of the drive unit comprises:

- in response to the detected value not being within the range of the reference value and the driving time being within the range of a second reference time, controlling the drive unit so that the driving force delivered to the toner refill cartridge is increased; and
- in response to the detected value not being within the range of the reference value and the driving time not being within the range of the second reference time, monitoring the amount of toner in the toner refill cartridge.

14. A non-transitory computer-readable storage medium comprising instructions that upon execution cause an image forming apparatus to:

- control provision of a driving force generated in a drive unit of the image forming apparatus to a toner refill cartridge when the toner refill cartridge is mounted on the image forming apparatus;
- control a supply of a toner to a developing device of the image forming apparatus from the toner refill cartridge;
- acquire a detected value corresponding to an amount of toner in the toner refill cartridge;
- control an operation of the drive unit based on the detected value;
- control the drive unit to stop operation and close a shutter of the toner refill cartridge; and
- detect removal of the toner refill cartridge when the toner refill cartridge is removed from the image forming apparatus.

* * * * *